ically to novel 3-benzoyl-3-azabicyclo-  # 3,384,636
3-BENZOYL-3-AZABICYCLO[3.2.2]NONANES Theodore E. Stanin and Vada L. Brown, Jr., Kingsport, Tenn., assignors to Eastman Kodak Company, Rochester, N.Y., a corporation of New Jersey
No Drawing. Continuation-in-part of application Ser. No. 276,195, Apr. 29, 1963. This application June 16, 1965, Ser. No. 464,533
5 Claims. (Cl. 260—239)

This application is a continuation-in-part of our co-pending application Ser. No. 276,195, filed Apr. 29, 1963, now U.S. Patent 3,334,087.

Our invention relates to novel chemical compounds and more particularly to novel 3-benzoyl-3-azabicyclo-[3.2.2]nonanes and their preparation. The compounds of our invention are amides of 3-azabicyclo[3.2.2]nonane and can be represented by the formula:

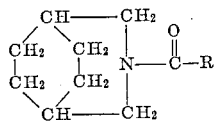

wherein R is a substituted or unsubstituted phenyl radical. The substituted or unsubstituted phenyl radical R can be represented by the formula:

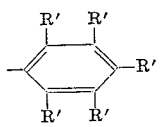

wherein each of the substituents R′ is a monovalent radical and at least two of the substituents R′ are hydrogen. Examples of the monovalent radicals which the substituents R′ can be include hydrogen, halogen, alkenyl, aryl, amino, cycloalkyl, cycloalkenyl, cyano, carboxy, hydroxy, formyl, nitro, carbamoyl, sulfamoyl, alkoxy, etc.

The halogen atoms which the substituents R′ can be include fluorine, chlorine, bromine, etc.

R′, when alkyl, is typically alkyl of 1 to about 18 carbon atoms and is preferably lower alkyl, e.g., alkyl of 1 to about 8 carbon atoms. Examples of suitable alkyl substituents include methyl, ethyl, propyl, isopropyl, butyl, isobutyl, sec-butyl, tert-butyl, pentyl, hexyl, heptyl, octyl, 2-ethylhexyl, decyl, dodecyl, tetradecyl, octadecyl, etc.

When alkenyl, R′ is typically alkenyl of 1 to about 18 carbon atoms. Included among the useful alkenyl substituents are vinyl, allyl, propenyl, 1-butenyl, 3-butenyl, pentenyl, etc., and more complex alkenyl substituents, such as 2{4-(3-azabicyclo[3.2.2]non-3-yl carbonyl)phenyl}vinyl, etc.

R′, when aryl, is preferably mononuclear carbocyclic aryl of up to about 18 carbons such as phenyl; o-tolyl; m-tolyl; p-tolyl; 2,3-dimethylphenyl; 2,4-diethylphenyl; 2,5-dipropylphenyl; 2,6-dimethylphenyl; 3,4-dibutyl-phenyl; 3,5-dimethylphenyl; etc.

When amino, R′ is preferably N-alkylamino, N,N-dialkylamino, or N-(hydroxyalkyl)amino of up to about 18 carbon atoms. Examples of the amino substituents which R′ can be include N-methylamino; N-ethylamino; N-propylamino; N-octylamino; N-isobutylamino; N-pentylamino; N,N-dimethylamino; N,N-diethylamino; N-methyl-N-ethylamino; N,N-dipentylamino; N,N-diisobutylamino; hydroxymethylamino; 2-hydroxyethylamino; 3-hydroxypropylamino; 4-hydroxybutylamino; 3-hydroxybutylamino; etc.

R′, when cycloalkyl or cycloalkenyl, typically has 4 to 8 ring carbon atoms such as cyclobutyl, cyclopentyl, cyclohexyl, cycloheptyl, cyclooctyl, 1-cyclobutenyl, 2-cyclobutenyl, 1-cyclopentenyl, 2-cyclopentenyl, 3-cyclopentenyl, 1-cyclohexenyl, 2-cyclohexenyl, 3-cyclohexenyl, 1-cycloheptenyl, 2-cycloheptenyl, 3-cycloheptenyl, 4-cycloheptenyl, 1-cyclooctenyl, 2-cyclooctenyl, 3-cyclooctenyl, 4-cyclooctenyl, etc.

Included among the carbamoyl substituents which R′ can be are N-alkylcarbamoyl and N,N-dialkylcarbamoyl groups such as N-methylcarbamoyl, N-ethylcarbamoyl, N-propylcarbamoyl, N,N-dibutylcarbamoyl, N-methyl-N-propylcarbamoyl and more complex substituents such as 3-azabicyclo[3.2.2]non-3-yl carbamoyl.

Among the sulfamoyl substituents which R′ can be are N-alkyl sulfamoyl and N,N-dialkyl sulfamoyl such as N-ethyl sulfamoyl, N-methyl sulfamoyl, N-butyl sulfamoyl, N-isobutyl sulfamoyl, N-octyl sulfamoyl, N,N-dimethyl sulfamoyl, N,N-dipropyl sulfamoyl, N,N-diisobutyl sulfamoyl, N-ethyl-N-heptyl sulfamoyl, and more complex substituents such as 3-azabicyclo[3.2.2]non-3-yl sulfonyl.

Illustrative of the alkoxy substituents which R′ can be include methoxy, ethoxy, propoxy, isopropoxy, butoxy, etc. Preferred among the alkoxy substituents are those having 1 to about 8 carbon atoms.

Among the especially preferred substituents which R′ can be are hydrogen; chlorine; bromine; hydroxy; nitro; carboxy; sulfo; methoxy; 3-azabicyclo[3.2.2]non-3-yl carbonyl; 3-azabicyclo[3.2.2]non-3-yl sulfonyl; and 2{4-(3-azabicyclo[3.2.2]non-3-yl carbonyl)phenyl}vinyl.

The novel compounds of our invention can be prepared by reacting 3-azabicyclo[3.2.2]nonane with a carbonyl containing compound according to the following equation:

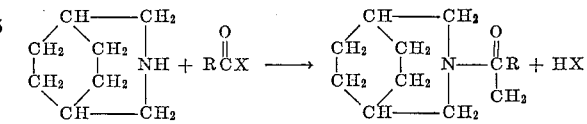

The carbonyl containing reactant in the preceding equation can be an acid halide, an acid anhydride, or an ester and the substituent X can thus be halogen, acyloxy, aryloxy or alkoxy. When X is acyloxy, i.e., when the carbonyl reactant is an acid anhydride, X and R can form a part of the same molecule as in phthalic anhydride. The substituent X, when aryloxy or alkoxy, can be represented by the formula —OR² in which R² is alkyl or aryl. R², when alkyl, is preferably lower alkyl and when aryl is preferably mononuclear carbocyclic aryl. When the substituent X is acyloxy, the reactant is an anhydride containing the radical

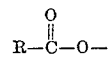

As previously pointed out, anhydrides of dicarboxylic acids, e.g., phthalic acid, are useful in the process of our invention.

The reaction of the 3-azabicyclo[3.2.2]nonane with the carbonyl containing compound is preferably carried out by contacting the reactants in a suitable vessel.

The contacting of the reactants is carried out in the liquid phase and the reaction is therefore generally carried out at a temperature between the melting point and boiling point of the reaction mixture. In many instances, the reaction is preferably carried out at room temperature while at other times the reaction is preferably carried out at the boiling point of the reaction mixture, e.g., by heating the reactants under reflux.

Stoichiometric equivalents of the reactants are preferably employed. Thus, when the carbonyl containing compound has a single reactive site as in benzoyl chloride, it is preferred to use approximately equimolar amounts of the reactants; but when the carbonyl compound has two reactive sites, as in terephthaloyl chloride, m-chlorosulfonylbenzoyl chloride, etc., it is preferred to use about 2 moles of 3-azabicyclo[3.2.2]nonane per mole of carbonyl containing compound. However, a stoichiometric excess of either the 3-azabicyclo[3.2.2]nonane or the carbonyl containing compound can be employed and is often preferred.

When the novel compounds of our invention are prepared by reacting a carboxylic acid halide with 3-azabicyclo[3.2.2]nonane, the reaction is preferably carried out by contacting the reactants in the presence of a basic compound, e.g., an alkali metal hydroxide, such as sodium hydroxide, potassium hydroxide, etc.

The reaction is preferably carried out in the presence of an inert solvent. Suitable inert solvents are those which dissolve each of the reactants but react with neither of them. When a basic compound is employed, e.g., in the reaction of a carboxylic acid halide with 3-azabicyclo[3.2.2]nonane, the solvent should dissolve the basic compound as well as both of the reactants.

When the novel compounds of our invention are prepared by reacting an aromatic carboxylic acid or an aromatic carboxylic acid anhydride with 3-azabicyclo[3.2.2]nonane, the reaction is preferably carried out by contacting the reactants in the presence of a catalytic amount of an esterification catalyst. Preferred esterification catalysts are mineral acids, e.g., hydrochloric acid, sulfuric acid, etc., or sulfonic acids, e.g., p-toluenesulfonic acid which are conventionally employed as esterification catalysts. However, such catalysts are not necessary in preparing the compounds of our invention and can be omitted if desired. If desired, an inert solvent can be employed. In many instances the removal of water from the reaction zone can be facilitated by the use of a solvent which forms an azeotrope with water.

A catalyst can be used when the novel compounds of our invention are prepared by reacting an aromatic carboxylic acid ester with 3-azabicyclo[3.2.2]nonane. Examples of useful catalysts are those which are conventionally employed in ester interchange reactions, i.e., strong acids, e.g., mineral acids such as hydrochloric acid, sulfuric acid, nitric acid, phosphonic acid, etc., or strong bases, e.g., alkali metal hydroxides or alkoxides such as sodium hydroxide, sodium ethoxide, etc. However, a catalyst is not necessary and can be omitted if desired.

The following examples illustrate the novel compounds of our invention and their preparation.

Example 1.—3-(m-bromobenzoyl)-3-azabicyclo [3.2.2]nonane

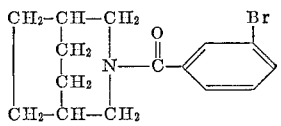

To a one (1) liter three-neck flask equipped with a stirrer, thermometer condenser, addition funnel, and water bath was added 11.4 g. (0.0912 mole) 3-azabicyclo[3.2.2]nonane, 3.7 g. (0.0925 mole) sodium hydroxide and 200 ml. water. To this stirred mixture was added 20.0 g. (0.0912 mole) m-bromobenzoyl chloride over a six-minute period. The temperature rose to 38° C. during the addition. After the addition had been completed, the reaction mixture was stirred for one hour without external heating or cooling. The reaction mixture was cooled to 10° C., and the solid product collected by filtration to yield 25.1 g. (89.5% of theory) of crude 3-(m-bromobenzoyl) - 3 - azabicyclo[3.2.2]nonane. Recrystallization from methyl alcohol yielded a product with a melting point of 108–112° C. uncorrected.

*Analysis.*—Calcd. for: C, 58.48%; H, 5.84%; N, 4.55%; Br, 25.94%. Found: C, 58.64%; H, 6.24%; N, 4.50%; Br, 25.60%.

Example 2.—3-benzoyl-3-azabicyclo[3.2.2]nonane

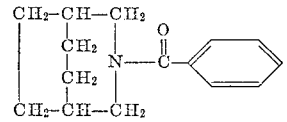

In a manner described in Example 1, 12 g. (0.3 mole) sodium hydroxide, 31.2 g. (0.25 mole) 3-azabicyclo[3.2.2]nonane, 150 ml. of water, and 35.1 g. (0.25 mole) benzoyl chloride were reacted to yield 49.6 g. (86.6% of theory) of crude 3-benzoyl - 3 - azabicyclo[3.2.2]nonane. Recrystallization from ethanol yielded a product with a melting point of 93–94° C. uncorrected.

*Analysis.*—Calcd. for: C, 78.40%; H, 8.23%; N, 6.20%. Found: C, 78.61%; H, 8.29%; N, 6.11%.

Example 3.—3-(2-hydroxybenzoyl)-3-azabicyclo [3.2.2]nonane

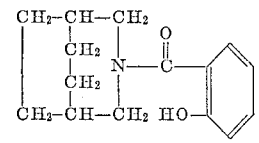

To a 500 ml. three-neck flask equipped with a thermometer, stirrer, Vigreux column, and distillation head, was charged 32.5 g. (0.26 mole) 3-azabicyclo[3.2.2]nonane, 53.2 g. (0.25 mole) phenyl salicylate and 100 ml. of 1,2,4-trichlorobenzene. The reaction mixture was heated, with stirring, to reflux and the phenol which formed in the head was removed. A total of 1.5 hours reaction time was required to remove 16 ml. of phenol, during which time the base temperature rose from 187–191° C. The reaction mixture was filtered hot, then the filtrate cooled to 20° C. and the solid product collected by filtration to yield 58 g. (95% of theory) of 3-(2-hydroxybenzyl) - 3 - azabicyclo[3.2.2] - nonane. Recrystallization from ethanol yielded a product which melted at 203–205° C. with partial sublimation at 175° C. uncorrected.

*Analysis.*—Calcd. for: C, 73.48%; H, 7.75%; N, 5.71%. Found: C, 73.37%; H, 7.83%; N, 5.60%.

Example 4.—3-(3,5-dinitrobenzoyl)-3-azabicyclo [3.2.2]nonane

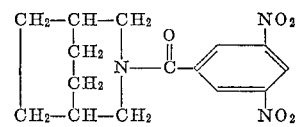

To a one (1) liter three-neck flask equipped with stirrer and thermometer was added 31.4 g. (0.25 mole) 3-azabicyclo[3.2.2]nonane, 200 ml. water and 133 ml. of 10% sodium hydroxide solution. To this stirred mixture was added the solid 3,5-dinitrobenzoyl chloride (57.6 g., 0.25 mole) in small portions over a nine-minute period. During this addition the temperature rose from 29° C. to 40° C. After the addition had been completed, the reaction mixture was stirred one hour and then cooled to 20° C. The product was collected by filtration to yield 43.3 g. (54.3% of theory) of 3-(3,5-dinitrobenzoyl) - 3 - azabicyclo[3.2.2]nonane. After recrystallization from isopropyl alcohol-water, with Darco G60 activated carbon for decolorization, the product melted at 158–163° C. uncorrected.

*Analysis.*—Calcd. for: C, 56.44%; H, 5.33%; N, 13.17%. Found: C, 56.18%; H, 5.44%; N, 13.01%.

Example 5.—3-(2-carboxybenzoyl)-3-azabicyclo [3.2.2]nonane

To a 500 ml. three-neck flask equipped with a stirrer, condenser, thermometer, and addition funnel was added 44.4 g. (0.3 mole) phthalic anhydride and 125 ml. of dry benzene. To this rapidly stirred slurry was added a solution of 37.5 g. (0.3 moles) 3-azabicyclo[3.2.2] nonane in 75 ml. of dry benzene. After the addition had been completed, the reaction mixture was stirred for one hour and then cooled to 5° C. The solid product was collected by filtration to yield 72.5 g. (88% of theory) of 3-(2 - carboxybenzoyl) - 3 - azabicyclo[3.2.2]nonane, M.P. 181–185° C.

*Analysis.*—Calcd. for: C, 70.34%; H, 6.96%; N, 5.13%. Found: C, 70.35%; H, 7.18%; N, 5.25%.

Example 6.—3-{3-(3-azabicyclo[3.2.2]nonan-3-yl sulfonyl)-benzoyl}-3-azabicyclo[3.2.2]nonane In a manner described in Example 1, 62.8 g. (0.5 mole) 3 - azabicyclo[3.2.2]nonane, 22 g. (0.55 mole) sodium hydroxide, 200 ml. water and 59.8 g. (0.25 mole) m-chlorosulfonyl benzoyl chloride were reacted to yield 104 g. (100% of theory) of crude 3-{3-(3-azabicyclo[3.2.2] nonan - 3 - yl sulfonyl)benzoyl} - 3 - azabicyclo[3.2.2] nonane. Recrystallization from isopropyl alcohol-water yielded a product with a melting point of 146–149° C.

*Analysis.*—Calcd. for: C, 66.35%; H, 7.69%; N, 6.73%. Found: C, 66.09%; H, 7.64%; N, 6.76%.

Example 7.—p-Bis(3-azabicyclo[3.2.2]non-3-ylcarbonyl) benzene

To a 500 ml. three-neck flask equipped with a thermometer, stirrer and solids addition funnel was charged 25 g. (0.2 mole) 3-azabicyclo[3.2.2]nonane and 150 ml. pyridine. To this stirred solution was added 20.3 g. (0.1 mole) terephthaloyl chloride over a ten-minute period. After the addition of the terephthaloyl chloride had been completed, the reaction mixture was stirred for one (1) hour without external heating or cooling. The reaction mixture was cooled to 0° C. and the solid product collected by filtration to yield 28.2 g. (49.5% of theory) of crude p-bis(3 - azabicyclo[3.2.2]non-3-yl carbonyl) benzene. Recrystallization from dimethylacetamide yielded a product which melted at 290–295° C.

*Analysis.*—Calcd. for: C, 75.80%; H, 8.42%; N, 7.37%. Found: C, 75.37%; H, 8.56%; N, 7.45%.

Example 8.—3-(2,4-dichlorobenzoyl)-3-azabicyclo[3.2.2] nonane

In a manner described in Example 1, 12.5 g. (0.1 mole) 3-azabicyclo[3.2.2]nonane, 4.2 g. (0.105 mole) sodium hydroxide, 150 ml. water and 21.0 g. (0.1 mole), 2,4-dichlorobenzoyl chloride were reacted to yield 27.2 g. (91% of theory) of crude 3-(2,4-dichlorobenzoyl)-3-azabicyclo[3.2.2]nonane. Recrystallization from methyl alcohol yielded a product with a melting point of 83–87° C.

*Analysis.*—Calcd. for: C, 60.44%; H, 5.7%; N, 4.7%; Cl, 23.79%. Found: C, 60.96%; H, 5.83%; N, 4.50%; Cl, 23.24%.

Example 9.—3-anisoyl-3-azabicyclo[3.2.2]nonane

In a manner described in Example 1, 3-azabicyclo [3.2.2]nonane (12.5 g., 0.1 mole), sodium hydroxide (4.1 g., 0.102 mole), 200 ml. water and anisoyl chloride (17.1 g., 0.1 mole) were reacted to yield 17.2 g. (6.5% of theory) of crude 3-anisoyl-3-azabicyclo[3.2.2]nonane. Recrystallization from methyl alcohol yielded a product with a melting point of 107–113° C.

*Analysis.*—Calcd. for: C, 74.14%; H, 8.10%; N, 5.41% Found: C, 74.10%; H, 8.12%; N, 5.24%.

Example 10.—3-(p-chlorobenzoyl)-3-azabicyclo[3.2.2] nonane

In the manner described in Example 1, 17.9 g. (0.143 mole) of 3-azabicyclo[3.2.2]nonane, 7 g. (0.175 mole) of sodium hydroxide, 200 ml. of water and 25 g. (0.141 mole) of p-chlorobenzoyl chloride were reacted to yield 3 - (p-chlorobenzoyl) - 3 - azabicyclo[3.2.2]nonane. Recrystallization from methyl alcohol-acetone yielded a pure material, M.P. sub. 150° C. dec. with melting above 210° C.

*Analysis.*—Calcd. for: C, 68.30%; H, 6.88%; N, 5.31; Cl, 13.44%. Found: C, 68.49%; H, 6.89%; N, 5.09%; Cl, 13.55%.

Example 11.—3,3'-[vinylenebis(p-phenylenecarbonyl)] bis-3-azabicyclo[3.2.2]nonane In a manner described in Example 7, 30.5 g. (0.1 mole) of 4,4'-stilbene dicarbonyl chloride, 25 g. (0.2 mole) of 3-azabicyclo[3.2.2]nonane, were reacted in 250 ml. of pyridine to yield 36 g. (74.6% of theory). Recrystallization from dimethylformamide yielded a product with a melting point of 258–263° C. uncorrected. This material has a blue fluorescence under ultraviolet light.

*Analysis.*—Calcd. for: C, 79.68%; H, 7.88%; N, 5.81%. Found: C, 79.35%; H, 7.85%; N, 5.80%.

Ultraviolet emission peaks at 406, 429 and 450 millimicrons.

Example 12.—3-(2-carboxy-3-nitrobenzoyl)-3-azabicyclo [3.2.2]nonane

In the manner described in Example 5, 48.2 g. (0.25 mole) of 3-nitrophthalic anhydride, 31.3 g. (0.25 mole) of 3-azabicyclo[3.2.2]nonane and 150 ml. of benzene were reacted to yield 68.3 g. (86% of theory) of 3-(2-carboxy-3-nitrobenzoyl)-3-azabicyclo[3.2.2]nonane. Recrystallization from methyl alcohol yielded a product which melted at 230–232° C.

*Analysis.*—Calcd. for: C, 60.20%; H, 5.95%; N, 8.78%. Found: C, 60.65%; H, 5.65%; N, 8.85%.

The novel compounds of our invention have a variety of uses as chemicals, pharmaceuticals, disinfectants, etc., and as intermediates in the preparation of various chemicals, pharmaceuticals, disinfectants, etc.

Thus, the compounds of our invention, e.g., 3-benzoyl-3 - azabicyclo[3.2.2]nonane; 3 - (3,5 - dinitrobenzoyl) - 3-azabicyclo[3.2.2]nonane; 3 - (3-azabicyclo[3.2.2]non-3-yl sulfonyl)benzo-3-yl-3-azabicyclo[3.2.2]nonane; etc., are useful as bactericides against organisms such as staphylococcus aureus. These compounds can be used as disinfectants, e.g., by mixing them with floor waxes, soaps, cleaners, etc.

Other compounds of our invention are useful as fungicidal agents and can be used as fungicidal agents for plants, e.g., by coating the plant with a solution of one of the compounds of our invention in a volatile or nonvolatile solvent, e.g., methyl or ethyl alcohol.

Certain of the compounds of our invention are also useful for preparing dyes or pigments. For example, a dye, useful on polyester and cellulose acetate films, can be prepared by reacting 3-(p-aminobenzoyl)-3-azabicyclo[3.2.2]nonane with 4,5-dinitrochrysazine in solution in ethylene glycol. A pigment suitable for incorporation in melt spun fibers, e.g., polyesters, can be prepared by heating a mixture of 3-nitro-4-chlorobenzene sulfonamide and 3-(p-aminobenzoyl)-3-azabicyclo[3.2.2]nonane.

The compound 3,3'[vinylene bis(p-phenylene carbonyl)]bis(3-azabicyclo[3.2.2]nonane) when exposed to ultraviolet light, fluoresces blue and is therefore useful as a fluorescent brightener for textile materials.

The invention has been described in detail with particular reference to preferred embodiments thereof, but it will be understood that variations and modifications can be effected within the spirit and scope of the invention as described hereinabove and as defined in the appended claims.

We claim:
1. 3-benzoyl-3-azabicyclo[3.2.2]nonane.
2. 3-(5-dinitrobenzoyl)-3-azabicyclo[3.2.2]nonane.
3. 3 - {3 - (3 - azabicyclo[3.2.2]nonan - 3 - yl sulfamyl)benzoyl}-3-azabicyclo[3.2.2]nonane.
4. 3,3'-[vinylene bis(p - phenylene carbamyl)]bis-(3-azabicyclo[3.2.2]nonane).
5. 3-(p-aminobenzoyl)-3-azabicyclo[3.2.2]nonane

References Cited

Wagner et al.: Synthetic Organic Chemistry (New York, 1953), pp. 566–569.

ALTON D. ROLLINS, *Primary Examiner.*

UNITED STATES PATENT OFFICE
CERTIFICATE OF CORRECTION

Patent No. 3,384,636                      May 21, 1968

Theodore E. Stanin et al.

It is hereby certified that error appears in the above numbered patent requiring correction and that the said Letters Patent should read as corrected below.

Column 2, lines 34 to 39, the formula should appear as shown below:

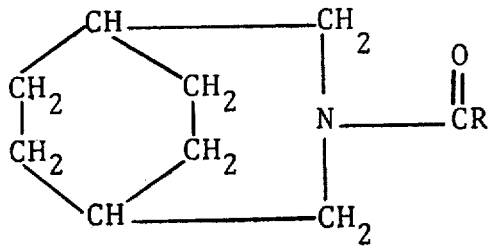

Column 6, line 18, "6.5%" should read -- 66.5% --; line 40, "5.31" should read -- 5.31% --. Column 8, line 16, "3-(5-dinitrobenzoyl)" should read -- 3-(3,5-dinitrobenzoyl) --.

Signed and sealed this 28th day of October 1969.

(SEAL)
Attest:

EDWARD M. FLETCHER, JR.                 WILLIAM E. SCHUYLER, JR.
Attesting Officer                         Commissioner of Patents